United States Patent
Stapp et al.

(10) Patent No.: US 11,927,116 B2
(45) Date of Patent: Mar. 12, 2024

(54) METHODS AND SYSTEMS FOR STARTING AND STOPPING A CLOSED-CYCLE TURBOMACHINE

(71) Applicant: Peregrine Turbine Technologies, LLC, Wiscasset, ME (US)

(72) Inventors: David Scott Stapp, Wiscasset, ME (US); Ian David Stapp, Wiscasset, ME (US)

(73) Assignee: Peregrine Turbine Technologies, LLC, Wiscasset, ME (US)

( * ) Notice: Subject to any disclaimer, the term of this patent is extended or adjusted under 35 U.S.C. 154(b) by 0 days.

(21) Appl. No.: 17/772,208

(22) PCT Filed: Oct. 28, 2020

(86) PCT No.: PCT/US2020/057772
§ 371 (c)(1),
(2) Date: Apr. 27, 2022

(87) PCT Pub. No.: WO2021/086989
PCT Pub. Date: May 6, 2021

(65) Prior Publication Data
US 2022/0403759 A1  Dec. 22, 2022

Related U.S. Application Data

(60) Provisional application No. 62/926,951, filed on Oct. 28, 2019.

(51) Int. Cl.
*F01K 13/02* (2006.01)
*F01K 3/22* (2006.01)
*F01K 7/32* (2006.01)
*F01K 25/10* (2006.01)
*F02C 1/10* (2006.01)

(52) U.S. Cl.
CPC ............... *F01K 13/02* (2013.01); *F01K 3/22* (2013.01); *F01K 7/32* (2013.01); *F01K 25/103* (2013.01); *F02C 1/10* (2013.01); *F05D 2260/85* (2013.01); *F05D 2260/90* (2013.01)

(58) Field of Classification Search
CPC ... F01K 13/02; F01K 3/22; F01K 7/32; F01K 25/10; F01K 25/103; F02C 1/10; F02C 1/105; F05D 2260/85; F05D 2260/90; F05D 2260/901; F05D 2260/904
See application file for complete search history.

(56) References Cited

U.S. PATENT DOCUMENTS

| | | | | |
|---|---|---|---|---|
| 2,994,198 A | * | 8/1961 | Snyder | F02C 1/04 236/23 |
| 6,644,062 B1 | | 11/2003 | Hays | |
| 9,388,817 B1 | * | 7/2016 | Wright | F04D 25/04 |
| 9,657,599 B2 | | 5/2017 | Stapp | |
| 10,012,448 B2 | * | 7/2018 | Laughlin | F01K 3/20 |
| 10,101,092 B2 | | 10/2018 | Stapp | |

(Continued)

FOREIGN PATENT DOCUMENTS

GB  959839 A  *  6/1964

*Primary Examiner* — Mark A Laurenzi
*Assistant Examiner* — Xiaoting Hu
(74) *Attorney, Agent, or Firm* — BakerHostetler

(57) ABSTRACT

The present disclosure relates to methods for starting and rapidly decelerating a turbomachine in a power generation system that utilizes a supercritical fluid in a closed cycle.

21 Claims, 5 Drawing Sheets

(56) References Cited

U.S. PATENT DOCUMENTS

| | | | |
|---|---|---|---|
| 2005/0056001 A1* | 3/2005 | Frutschi | F02C 6/18 60/39.182 |
| 2012/0047892 A1* | 3/2012 | Held | F01K 3/185 60/660 |
| 2012/0131919 A1* | 5/2012 | Held | F01K 25/103 60/656 |
| 2013/0036736 A1* | 2/2013 | Hart | F01K 3/185 60/645 |
| 2014/0050593 A1* | 2/2014 | Vermeersch | F01K 13/02 417/207 |
| 2014/0088773 A1* | 3/2014 | Davidson | H02K 7/18 700/288 |
| 2014/0103661 A1* | 4/2014 | Kacludis | F02C 1/04 290/54 |
| 2014/0208750 A1 | 7/2014 | Vermeersch | |
| 2014/0252767 A1* | 9/2014 | Hashimoto | H02P 9/102 290/43 |
| 2015/0167554 A1 | 6/2015 | Cho et al. | |
| 2016/0010512 A1* | 1/2016 | Close | F01K 11/04 60/671 |
| 2016/0017758 A1* | 1/2016 | Vermeersch | F01K 13/02 60/646 |
| 2016/0319749 A1* | 11/2016 | Laffont | F02C 9/20 |
| 2016/0348539 A1 | 12/2016 | Peter | |
| 2017/0314419 A1* | 11/2017 | Bowan | F04D 13/04 |
| 2017/0314420 A1* | 11/2017 | Bowan | F01K 11/02 |
| 2018/0179917 A1* | 6/2018 | Apte | F01K 25/103 |
| 2018/0187627 A1* | 7/2018 | Apte | F22B 1/006 |
| 2018/0283222 A1* | 10/2018 | Park | F01K 7/165 |
| 2020/0102895 A1* | 4/2020 | Fetvedt | F01K 7/165 |
| 2022/0178268 A1* | 6/2022 | Angel | H02P 9/102 290/43 |

* cited by examiner

METHODS AND SYSTEMS FOR STARTING AND STOPPING A CLOSED-CYCLE TURBOMACHINE

CROSS-REFERENCE TO RELATED APPLICATIONS

The present application is the National Stage Application of International Patent Application No. PCT/US2020/057772, filed Oct. 28, 2020, which claims priority to and the benefit of U.S. Provisional Application No. 62/926,951, filed Oct. 28, 2019, the entire contents of which are incorporated by reference into this application in their entirety.

BACKGROUND

Starting a turbomachine usually requires either: 1) a starter motor that drives the compressor to a speed where ignition is sustainable within the combustor and the energy extracted by the high pressure turbine exceeds what is required to sustain speed of the core; or 2) a source of compressed fluid (air or otherwise) which can inject compressed flow into the combustion chamber resulting in sustained combustion and acceleration of the high pressure turbine. In addition, turbomachines may utilize foil bearings to support a shaft that connects the compressor to the high-pressure turbine.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

Closed-cycle turbomachines do not lend themselves readily to the scenario where compressed flow is injected. Closed systems are usually based on the Rankine cycle which requires a long cycle of heating of the working fluid to cause phase change in the boiler or primary heater. Additionally, using a starter motor in a closed-cycle system to rotate the compressor/turbine spool can sometimes result in the working fluid flowing through the cycle in the wrong direction resulting in a failed start, unless check valves are employed.

Where supercritical fluids are used as the working fluid in a closed-cycle turbomachine, it is possible to use a compressed stored supply of working fluid to start the turbomachine. Such a method requires one or more supply tanks charged to a pressure above the steady-state design operating pressure of the turbomachine, which adds to the cost, complexity and footprint of the complete machine. It is also possible to use a motor-driven compressor as a means of creating a pressure rise capable of starting the closed-cycle turbomachine. This method has several drawbacks. It requires an expensive high-speed motor, a high-pressure casing, and battery or facility power. In addition, sophisticated moving parts add to machine cost, are prone to needing service, and reduce reliability of the overall system.

Disclosed herein are methods and systems for starting a closed-cycle turbomachine that utilizes a supercritical fluid as a working fluid. In one exemplary method in a system for generating power utilizing a closed cycle with a working fluid, when the working fluid is in a supercritical state, the closed cycle including a turbomachine comprising a supercritical fluid compressor connected via a shaft to a supercritical fluid turbine, the method for starting the turbomachine comprises the steps of: charging a mass of working fluid that is not in the supercritical state in the closed cycle up to a starting mass that is greater than a design operating mass, wherein the design operating mass is the mass of working fluid in the closed cycle when operating at steady-state design point conditions; heating the working fluid; and venting a discharge mass of working fluid from the closed cycle at a location in the closed cycle that is on an exhaust side of the supercritical fluid turbine.

In some turbomachine applications, foil bearings are used to support a shaft connecting the compressor to the high-pressure turbine. In operation, once the shaft is spinning fast enough (i.e., at or above a critical speed), the working fluid creates a gap between the bearing and the shaft, such that no wear occurs. However, the bearing will contact the shaft during the turbomachine startup and shutdown when the shaft is rotating at speeds less than the critical speed. Thus, decelerating the turbomachine quickly during the shutdown process may have the desired effect of increasing bearing life.

Disclosed herein are methods for rapidly decelerating a turbomachine in a closed supercritical fluid cycle. In one exemplary method in a system for generating power utilizing a supercritical fluid in a closed cycle, the closed cycle including a turbomachine comprising a supercritical fluid compressor connected via a shaft to a supercritical fluid turbine and at least one heat exchanger disposed along the closed cycle and configured to reduce a temperature of the supercritical fluid entering an inlet of the compressor, a method for decelerating the turbomachine comprising the steps of: directing a flow of supercritical fluid from the compressor to an inlet of the turbine; directing the flow of supercritical fluid from the turbine to the at least one heat exchanger; directing the flow of supercritical fluid from the at least one heat exchanger to the inlet of the compressor; and reducing a flow of a cooling medium to the at least one heat exchanger, thereby allowing the temperature of the supercritical fluid entering the compressor inlet to increase, wherein the increased temperature of the supercritical fluid entering the compressor inlet causes the turbomachine to decelerate.

This Summary is provided to introduce a selection of concepts in a simplified form that are further described below in the Detailed Description section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

The foregoing summary, as well as the following detailed description, are better understood when read in conjunction with the appended drawings. In the drawing, for purposes of explanation, numerous specific details are set forth in order to provide an understanding of the variations in implementing the disclosed technology. However, the instant disclosure may take many different forms and should not be construed as limited to the specific examples disclosed in the drawings. When practical, like numbers refer to like elements throughout. In the drawings.

DETAILED DESCRIPTION

The methods and systems as described herein may include components and configurations of the power generation systems disclosed in U.S. Pat. No. 9,657,599 (the "'599 Patent"), filed Feb. 26, 2015, and U.S. Pat. No. 10,101,092 (the "'092 Patent"), filed Aug. 21, 2015, the disclosures of which relating to the structure and function of the power generation systems are incorporated by reference into this present application.

In one aspect of the disclosure, a closed cycle includes a turbomachine that comprises a compressor connected via a shaft to a high-pressure turbine. The discharge start method comprises charging the closed cycle with an excess mass of a working fluid and heating the working fluid by an external means, thereby raising the temperature and pressure of the working fluid in the closed cycle. In one exemplary method, sufficient heat is added to raise the temperature of the working fluid to make it supercritical. A mass of working fluid is vented from the closed cycle at a location downstream of the high-pressure turbine. The resulting pressure drop causes the working fluid to flow through the closed cycle and rotate the high-pressure turbine wheel, which drives the compressor. The working fluid entering the compressor is in a supercritical state (i.e., at or above the critical point). Accordingly, compressed supercritical fluid is discharged from the compressor to flow through the closed cycle. The flow of compressed supercritical fluid is heated and directed to the high-pressure turbine inlet. The turbine expands the heated compressed supercritical fluid and exhausts expanded supercritical fluid, which is directed through the closed cycle back to the compressor. The process continues until a start is achieved. The discharge valve is closed when the desired mass of working fluid has been vented from the closed cycle.

Figure 1:
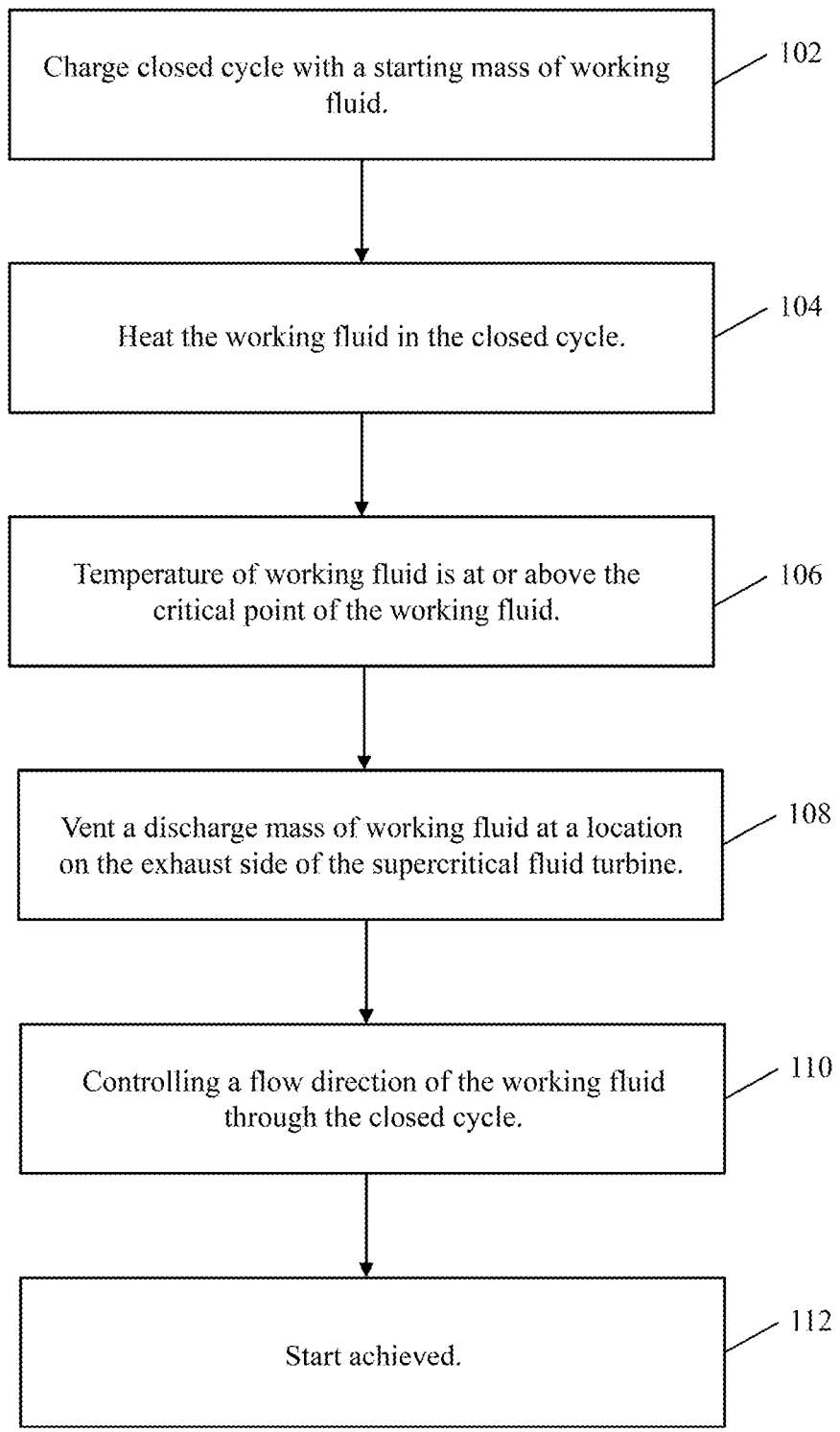
FIG. 1 illustrates an exemplary method for starting a turbomachine in a power generation system that utilizes a supercritical fluid in a closed cycle.

FIG. 1 illustrates an exemplary method for starting a turbomachine in a power generation system that utilizes a supercritical fluid in a closed cycle. The turbomachine may comprise a core that includes a supercritical fluid compressor connected via a shaft to a first supercritical fluid turbine (also referred to herein as the high-pressure supercritical fluid turbine). The turbomachine may further comprise a second supercritical fluid turbine (referred to herein as a power turbine) that produces shaft power for an output device (e.g., generator, turboprop, turbofan, or gearbox). The power turbine may be positioned along the closed cycle on the exhaust side of the high-pressure supercritical fluid turbine. The term "supercritical fluid" refers to a fluid in which distinct liquid and gaseous phases do not exist, and the term "critical point" of a supercritical fluid refers to the lowest temperature and pressure at which the substance can be said to be in a supercritical state. The terms "critical temperature" and "critical pressure" refer to the temperature and pressure at the critical point. For carbon dioxide, the critical point is approximately 304.2° K and 7.35 MPa.

Referring to FIG. 1, step 102, the closed cycle may be charged with a starting mass of a working fluid (e.g., carbon dioxide) that is greater than a design operating mass of working fluid, wherein the design operating mass of working fluid is the mass of the working fluid in the supercritical fluid cycle when the power generation system is operating at steady-state design point conditions. At this step, the working fluid that is charged into the closed cycle is below its critical point (i.e., it is not a supercritical fluid).

At step 104, heat is added to the working fluid in the closed cycle. As discussed below, heat may be added to the working fluid in the closed cycle via various means. For example, the power generation system may include a second cycle configured to heat a second working fluid, and one or more heat exchangers configured to transfer heat from the second working fluid to the working fluid in the closed cycle. In one example, the second cycle may be an air breathing cycle that includes a combustor configured to burn fossil fuel, biomass, bio-derived fuels, or waste in air, thereby heating the air flowing along the air breathing cycle. The power generation system may then utilize one or more heat exchangers to transfer heat from the heated air to the working fluid in the closed system. Alternatively, the second cycle may produce system heat by means of a solar collector, a nuclear reactor, or Thermal Energy Storage (TES). One exemplary TES thermal storage medium is "thermal bricks" comprising a Miscibility Gap Alloy (MGA) that is capable of storing large amounts of energy as heat. Electrical power from a renewable source, such as solar or wind energy, may be directed to heating the MGA storage medium. The MGA based TES has environmental and cost benefits over traditional battery storage of electrical energy produced by renewable power sources (e.g., longer life span, non-toxic, and recyclable). The second cycle may utilize one or more heat exchangers to transfer heat from the second cycle to the working fluid in the closed system.

At step 106, sufficient heat may be added to raise the temperature of the working fluid in the closed system to that which is required to make the working fluid supercritical. In another aspect of the disclosure, the working fluid may be heated such that the working fluid, located at an inlet of the supercritical fluid compressor, is at or above the critical point of the working fluid. Alternatively, the working fluid may be heated to within a predetermined temperature range of the critical temperature of the working fluid. For example, the working fluid may be heated to within 10 to 15 degrees Kelvin (° K) of its critical temperature. In another alternative, the working fluid may be heated to within 5 to 10° K of its critical temperature. In yet another alternative, the working fluid may be heated to within 2 to 5° K of its critical temperature. In yet another alternative, the working fluid may be heated to within 1 to 2° K of its critical temperature. In yet another alternative, the supercritical fluid may be heated to within 0.2 to 1° K of its critical temperature.

At step 108, a discharge mass of working fluid is vented from a location along the closed cycle that is on an exhaust side of the high-pressure supercritical fluid turbine. The resulting pressure sink aft of the high-pressure turbine may cause the working fluid to flow along a flow path in the closed cycle. The flow path may direct the working fluid to flow through one or more heat exchangers where heat is added to the flow of working fluid via the second cycle (e.g., via heated air). The heated working fluid may then be directed to an inlet of the high-pressure supercritical fluid turbine, thereby initiating rotation of the high-pressure turbine wheel, which drives the compressor to supply additional compressed flow of the working fluid until a start is successfully achieved at step 112.

At step 108, venting the discharge mass may reduce the mass of working fluid in the closed cycle from the starting mass to the design operating mass. Alternatively, venting the discharge mass at step 108 may reduce the mass of working fluid in the closed system to an amount that is less than the starting mass but greater than the design operating mass. In another aspect, the venting step 108 may be used to reduce the mass of working fluid in the closed cycle to an amount that is less than the design operating mass. For example, it may be desirable to operate the power generation system for an extended time at operating speeds different from the design point. In that scenario, a second discharge mass of working fluid may be vented from the closed cycle to achieve a desired new operating mass, wherein the working fluid at the compressor inlet is close to the critical point, thereby optimizing the system efficiency.

At step 108, the venting may be performed by opening a discharge valve located on the exhaust end of the high-pressure turbine. The discharge valve may be opened for a prescribed length of time to vent the desired amount of working fluid from the closed cycle. In addition, the rate at which the working fluid is encouraged to flow along the closed cycle flow path may be controlled by varying the opening of the discharge valve, thereby controlling the rate of acceleration of the turbomachine. Controlling the rate of acceleration of the turbomachine may have benefits, including managing radial loads on the radial bearings, as well as allowing an operator to transit rotor dynamically-unstable speeds at a rate which protects the turbomachine from damage.

At step 108, the discharge mass of working fluid may be vented from the closed cycle into a containment vessel that is at a lower pressure than the pressure inside the closed cycle. Alternatively, the discharge mass may be vented to atmosphere.

The method may include optional step 110 to control a flow direction the working fluid through the closed cycle along the closed cycle flow path. For example, the power generation system may include a check valve located downstream from the discharge valve to encourage the majority of working fluid to flow through the closed cycle in the desired direction (e.g., from the compressor outlet to the high-pressure turbine inlet and from the high-pressure turbine outlet to the compressor inlet). The inventors have determined that a Tesla valve (also called a fluidic diode) is useful for performing this step. The Tesla valve has no moving parts and, therefore, does not decrease the reliability of the power generation system. Alternatively, the turbomachine may include a second supercritical fluid turbine (e.g., a power turbine) that may comprise one or more turbine nozzles configured to have fluidic diode characteristics that all discourage backflow of the working fluid in the closed cycle. Thus, the one or more power turbine nozzles may encourage the majority of working fluid to flow through the closed cycle in the desired direction.

In an alternative application, the discharge start method may comprise the steps of: step 102, charging the closed cycle with a starting mass of working fluid; step 104, heating the working fluid; and step 108, venting a discharge mass of working fluid at a location on the exhaust side of the supercritical fluid turbine. In this exemplary method, the discharge mass may be vented from the closed cycle when the temperature of the working fluid is within a predetermined temperature range of the critical temperature of the working fluid, as discussed above. This would result in two phase flow of the working fluid along the closed cycle flow path for some period of time after the turbomachine start until sufficient heat is added to the working fluid via the one or more heat exchangers to raise the temperature of the working fluid to be at or above the critical point.

Figure 2:
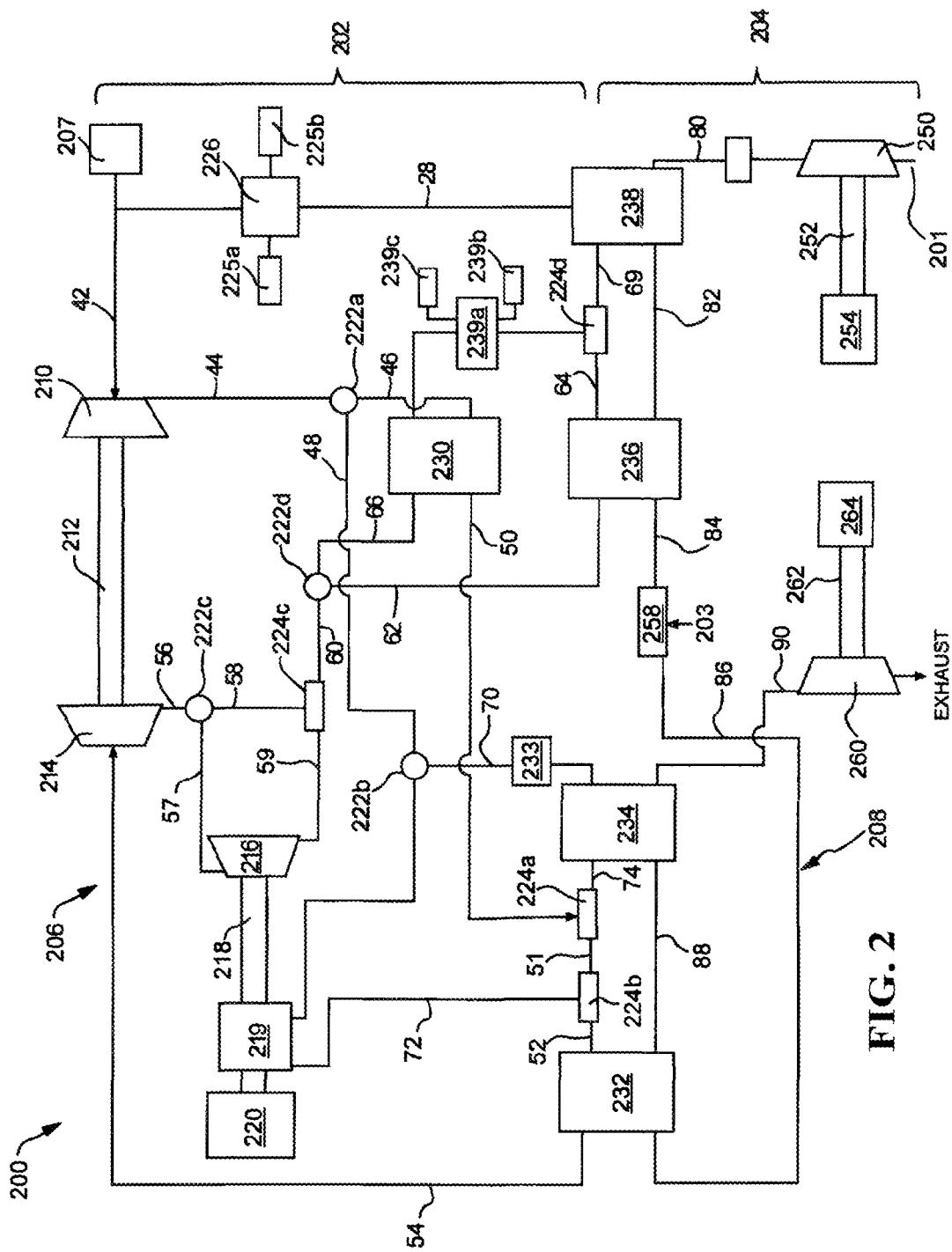
FIG. 2 is a schematic diagram of an exemplary power generation system according to an aspect of the present disclosure.
Figure 3:
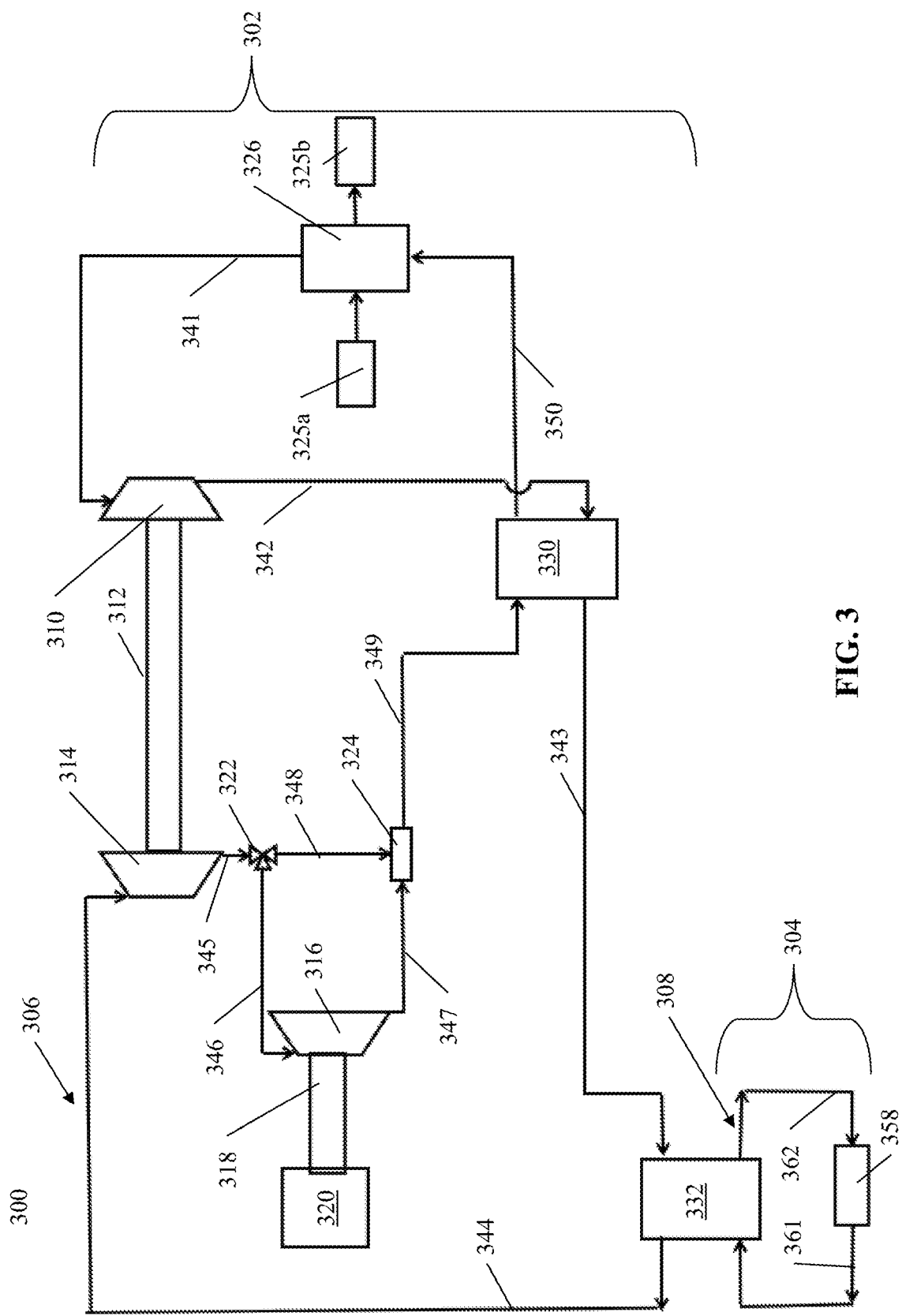
FIG. 3 is a schematic diagram of an exemplary power generation system according to another aspect of the present disclosure.

FIG. 2 is a schematic diagram of a power generation system 200 initially disclosed in the '599 Patent FIG. 3 and column 8, line 1 through column 10, line 53. The power generation system 200 illustrated in FIG. 2 and described herein includes additional features that may allow system 200 to implement the turbomachine discharge start method illustrated in FIG. 1. Power generation system 200 includes a first closed Brayton cycle 202, in which the working fluid may be a supercritical fluid, such as supercritical carbon dioxide (SCO2), and a second cycle 204 that is configured to add heat to the supercritical fluid cycle 202. For example, the second cycle 204 may be an open Brayton cycle in which the working fluid may be air. The supercritical fluid cycle 202 includes a supercritical fluid flow path 206 and the air breathing cycle 204 includes an air flow path 208. The flow paths 206, 208 are separate so that little or no mixing occurs between the supercritical fluid and air.

Referring to FIG. 2, system 200 includes at least one core disposed along supercritical fluid flow path 206. Each core includes a supercritical fluid compressor 210 connected via a shaft 212 to a first supercritical fluid turbine 214. The compressor 210, shaft 212, and turbine 214 may also be collectively referred to herein as a turbomachine. The compressor 210 may be an axial, radial, reciprocating or the like type of compressor. The turbine 214 may be referred to as the high-pressure turbine. Power generation system 200 may also include a second supercritical fluid turbine 216 (also referred to herein as a power turbine) connected via a shaft 218 to an output device 220 (e.g., generator, turboprop, turbofan, or a gearbox). The compressor 210 is configured to receive and compress a supercritical fluid and the turbine 214 is configured to receive and expand the supercritical fluid. The power generation system 200 may also include valves 222, mixing junctions 224, coolers 226, couplings, flow meters (not shown), temperature and pressure sensors (not shown), and one or more controllers (not shown) configured to control the operation of system 200.

The air breathing cycle 204 may include at least one combustor 258 arranged along air flow path 208 and configured to receive and combust a fossil fuel, biomass, bio-derived fuels, or waste in air, thereby heating the air flowing along the air flow path 208.

Power generation system 200 may also include one or more cross cycle heat exchangers 232, 234, 236, 238 arranged along flow paths 206, 208. As used herein, the term "cross cycle heat exchanger" refers to a heat exchanger that receives working fluids from two different cycles and transfers heat between the two respective working fluids. For example, cross cycle heat exchanger 232, also referred to herein as the primary cross cycle heat exchanger, is arranged along flow paths 206 and 208, and receives heated air exiting the combustor 258 along the air flow path 208 and supercritical fluid from the supercritical fluid flow path 206 and thereby transfers heat from the heated air to the supercritical fluid.

The power generation system 200 may also include a recuperating heat exchanger 230 arranged along the supercritical fluid flow path 206. As used herein, the term "recuperating heat exchanger" refers to a heat exchanger arranged along a single cycle flow path that transfers heat between different portions of the working fluid flowing within the cycle. For example, recuperating heat exchanger 230 is arranged along supercritical fluid flow path 206 and receives a portion of the compressed supercritical fluid 46 discharged from the supercritical fluid compressor 210 and a portion of the hot expanded supercritical fluid 66 discharged from the supercritical fluid turbine 214. In the recuperating heat exchanger 230, heat is transferred from the portion of hot expanded supercritical fluid 66 to the portion of compressed supercritical fluid 46, such that heated compressed supercritical fluid 50 and cooled supercritical fluid 68 exit recuperating heat exchanger 230. Thus, the recuperating heat exchanger 230 enables heat transfers between different portions of the supercritical fluid flowing within the supercritical fluid cycle.

In an exemplary operation referring to FIGS. 1 and 2, the discharge start method comprises step 102 of charging the closed supercritical fluid cycle 202 with a starting mass of a working fluid (e.g., carbon dioxide) that is greater than a design operating mass of working fluid, wherein the design operating mass is the mass of carbon dioxide in the supercritical fluid cycle 202 when the power generation system 200 is operating at steady-state design point conditions. At this step, the carbon dioxide that is charged into the closed cycle 202 is below its critical point (i.e., it is not a supercritical fluid). Charging cycle 202 with a starting mass of carbon dioxide effectively makes the supercritical fluid cycle portion of power generation system 200 the pressure vessel that would normally be associated with a blowdown supply tank(s) of carbon dioxide required in an alternative method of starting a closed cycle turbomachine.

At step 104, heat is added to the carbon dioxide in supercritical fluid cycle 202. For example, heat may be added from a second cycle via cross cycle heat exchangers 232 and 234. Air may be flowed along air flow path 208 through cross cycle heat exchangers 232, 234, 236, 230 in the order of 238→236→232→234. A combustor 258 configured to combust a fossil fuel in air, so as to heat the air flowing along air flow path 208, may be arranged between cross cycle heat exchangers 236 and 232 such that the air entering 232 is hotter than the air exiting 236. One or more circulation pumps (not shown) may be used to flow the carbon dioxide along supercritical fluid flow path 206 through cross cycle heat exchangers 232 and 234, wherein heat is transferred from the heated air to the carbon dioxide. Alternatively, the carbon dioxide in the closed supercritical fluid cycle 202 may be heated via external heaters, such as infrared (IR) lamps or heat tape. In another alternative, the carbon dioxide in the closed supercritical fluid cycle 202 may be heated by a combination of external heaters and heat transfer from a second cycle via flowing through one or more cross cycle heat exchangers.

At step 106, sufficient heat may be added to raise the temperature of the carbon dioxide in the supercritical fluid cycle 202 to that which is required to make the carbon dioxide supercritical (i.e., the carbon dioxide is at or above its critical point of approximately 304.2° K and 7.35 MPa). In an alternative example, at step 106, the carbon dioxide in the supercritical fluid cycle 202 may be heated such that the carbon dioxide, located at an inlet of the supercritical fluid compressor 210, is at or above the critical point of carbon dioxide.

At step 108, a discharge mass of carbon dioxide may be vented from a location along supercritical fluid cycle 202 that is on an exhaust side of the high-pressure supercritical fluid turbine 214. For example, a discharge valve 222c may be located along supercritical flow path 206 after the high-pressure turbine 214 (e.g., along section 56). Alternatively, a discharge valve 222c may be located along supercritical flow path 206 after the power turbine 216 (e.g., along section 60). The discharge valve 222c may be in electronic communication with a controller (not shown). Discharge valve 222c may be opened for a prescribed length of time to vent the desired amount of carbon dioxide from supercritical fluid cycle 202. For example, discharge valve 222c may be opened to vent a discharge mass of carbon dioxide that reduces the mass of carbon dioxide in the supercritical fluid cycle from the starting mass to the design operating mass. Alternatively, discharge valve 222c may be opened to vent and reduce the mass of carbon dioxide in the supercritical fluid cycle 202 to an amount that is less than the starting mass but greater than the design operating mass. At step 108, the discharge mass of carbon dioxide may be vented from the closed cycle 202 into a containment vessel (not shown) that is at a lower pressure than the pressure inside the closed cycle. Alternatively, the discharge mass may be vented to atmosphere.

Opening discharge valve 222c may result in a pressure sink aft of the high-pressure turbine 214 that may cause the carbon dioxide to flow along supercritical flow path 206. For example, the carbon dioxide may flow along sections 50 and 70 of supercritical flow path 206 and flow through cross cycle heat exchangers 232 and 234, wherein heat is transferred to the carbon dioxide from the heated air flowing along air flow path 208. The heated carbon dioxide is directed along section 54 to the inlet of the high-pressure turbine 214, thereby initiating rotation of the high-pressure turbine wheel, which drives the compressor 210 via shaft 212. The compressor 210 supplies additional compressed flow of carbon dioxide (which may be in a supercritical state) along section 44 of supercritical fluid flow path 206 until a start is successfully achieved at step 212.

The rate at which the carbon dioxide fluid is encouraged to flow along supercritical flow path 206 may be controlled by varying the opening of the discharge valve 222c, thereby controlling the rate of acceleration of the turbomachine. Controlling the rate of acceleration of the turbomachine may have benefits, including managing radial loads on the radial bearings, as well as allowing an operator to transit rotor dynamically-unstable speeds at a rate which protects the turbomachine from damage.

The discharge start method may also include optional step 110 to control a flow direction of the working fluid through the closed supercritical fluid cycle 202 along supercritical flow path 206. In an exemplary operation, working fluid may flow from the compressor outlet along sections 44, 50, and 70 to heat exchangers 232 and 234 and to the high-pressure turbine inlet via section 54. And working fluid may flow from the high-pressure turbine outlet along sections 56, 62, and 66 to heat exchangers 236 and 238 and to the compressor inlet via section 42. The supercritical fluid cycle 202 may include a check valve located downstream from the discharge valve that may help to encourage the majority of carbon dioxide to flow along the supercritical fluid flow path 206 in the desired direction. For example, a check valve may be located along section 60 of the supercritical flow path 206. Alternatively, check valves may be located along sections 57 and 58 of the supercritical flow path 206. In another alternative, power turbine 216 may comprise one or more turbine nozzles configured to discourage backflow of the working fluid along supercritical flow path 206 (e.g., flowing from the power turbine 216 along section 57 to the high-pressure turbine 214).

In an alternative application, the discharge start method may comprise the steps of: step 102, charging the closed cycle 202 with a starting mass of working fluid (e.g., carbon dioxide); step 104, heating the working fluid; and step 108, venting a discharge mass of working fluid from discharge valve 222c until a start is achieved. In this exemplary method, the discharge mass may be vented from the closed cycle 202 when the temperature of the working fluid is within a predetermined temperature range of the critical temperature of the working fluid (e.g., for carbon dioxide, approximately 304.2° K and 7.35 MPa). For example, the carbon dioxide may be heated to within 10 to 15° K of its critical temperature. In another alternative, the carbon dioxide may be heated to within 5 to 10° K of its critical temperature. In yet another alternative, the carbon dioxide may be heated to within 2 to 5° K of its critical temperature. In yet another alternative, the carbon dioxide may be heated to within 1 to 2° K of its critical temperature. In yet another alternative, the supercritical fluid may be heated to within 0.2 to 1° K of its critical temperature. This would result in two phase flow of the carbon dioxide along the closed cycle flow path 206 for some period of time after the turbomachine start until sufficient heat is added to the carbon dioxide via heat exchangers 232, 234 to raise the temperature of the carbon dioxide to be at or above its critical point.

FIG. 3 is a schematic diagram of a power generation system 300 that may implement the turbomachine discharge start method illustrated in FIG. 1. Power generation system 300 includes a first closed Brayton cycle 302, in which the working fluid may be a supercritical fluid, such as supercritical carbon dioxide (SCO2), and a second cycle 304 that is configured to add heat to the supercritical fluid cycle 302. The second cycle 304 is illustrated in simplified form. As discussed above, the second cycle may be an air breathing cycle that includes a combustor 358 configured to burn fossil fuel, biomass, bio-derived fuels, or waste in air, thereby heating the air flowing along the air breathing cycle. Alternatively, the second cycle may produce system heat by means of a solar collector, a nuclear reactor, or Thermal Energy Storage (TES). The second cycle may utilize one or more heat exchangers 332 to transfer heat from the second cycle to the working fluid in the closed system. The supercritical fluid cycle 302 includes a supercritical fluid flow path 306 and the second cycle 304 includes a thermal medium flow path 308. The flow paths 306, 308 are separate so that little or no mixing occurs between the supercritical fluid and the thermal medium.

Referring to FIG. 3, system 300 includes at least one core disposed along supercritical fluid flow path 306. Each core includes a supercritical fluid compressor 310 connected via a shaft 312 to a first supercritical fluid turbine 314. The compressor 310, shaft 312, and turbine 314 may also be collectively referred to herein as a turbomachine. The compressor 310 may be an axial, radial, reciprocating or the like type of compressor. The turbine 314 may be referred to as the high-pressure turbine. Power generation system 300 may also include a second supercritical fluid turbine 316 (also referred to herein as a power turbine) connected via a shaft 318 to an output device 320 (e.g., generator, turboprop, turbofan, or a gearbox). The compressor 310 is configured to receive and compress a supercritical fluid and the turbine 314 is configured to receive and expand the supercritical fluid. The power generation system 300 may also include a discharge valve 322, mixing junctions 324, coolers 326, couplings, flow meters (not shown), temperature and pressure sensors (not shown), and one or more controllers (not shown) configured to control the operation of system 300.

Power generation system 300 may also include one or more cross cycle heat exchangers 332 arranged along flow paths 306, 308. For example, cross cycle heat exchanger 332 is arranged along flow paths 306 and 308 and receives the supercritical fluid from the supercritical fluid flow path 306 and transfers heat from the thermal medium in the second cycle 304 to the supercritical fluid.

The power generation system 300 may also include a recuperating heat exchanger 330 arranged along the supercritical fluid flow path 306. Recuperating heat exchanger 330 may be arranged along supercritical fluid flow path 306 and receive the compressed supercritical fluid 342 discharged from the supercritical fluid compressor 310 and the hot expanded supercritical fluid 349 discharged from the supercritical fluid turbine 314, 316. In the recuperating heat exchanger 330, heat is transferred from the hot expanded supercritical fluid 349 to the compressed supercritical fluid 342, such that heated compressed supercritical fluid 343 and cooled supercritical fluid 350 exit recuperating heat exchanger 330. Thus, the recuperating heat exchanger 330 enables heat transfers between different portions of the supercritical fluid flowing within the supercritical fluid cycle.

In an exemplary operation referring to FIGS. 1 and 3, the discharge start method comprises step 102 of charging the closed supercritical fluid cycle 302 with a starting mass of a working fluid (e.g., carbon dioxide) that is greater than a design operating mass of working fluid, wherein the design operating mass is the mass of carbon dioxide in the supercritical fluid cycle 302 when the power generation system 300 is operating at steady-state design point conditions. At this step, the carbon dioxide that is charged into the closed cycle 302 is below its critical point (i.e., it is not a supercritical fluid). Charging cycle 302 with a starting mass of carbon dioxide effectively makes the supercritical fluid cycle portion of power generation system 300 the pressure vessel that would normally be associated with a blowdown supply tank(s) of carbon dioxide required in an alternative method of starting a closed cycle turbomachine.

At step 104, heat is added to the carbon dioxide in supercritical fluid cycle 302. For example, heat may be added from a second cycle via cross cycle heat exchanger 332. One or more circulation pumps (not shown) may be used to flow the carbon dioxide along supercritical fluid flow path 306 through cross cycle heat exchanger 332, wherein heat is transferred from the second cycle to the carbon dioxide. By way of example, the second cycle 304 may include Thermal Energy Storage (TES). Cross cycle heat exchanger 332 may be embedded in the TES such that heat from the TES is transferred to the carbon dioxide as it flows along supercritical flow path 306 through heat exchanger 332. Alternatively, the carbon dioxide in the closed supercritical fluid cycle 302 may be heated via external heaters, such as infrared (IR) lamps or heat tape. In another alternative, the carbon dioxide in the closed supercritical fluid cycle 302 may be heated by a combination of external heaters and heat transfer from the second cycle via flowing through one or more cross cycle heat exchangers 332.

At step 106, sufficient heat may be added to raise the temperature of the carbon dioxide in the supercritical fluid cycle 302 to that which is required to make the carbon dioxide supercritical (i.e., the carbon dioxide is at or above its critical point of approximately 304.2° K and 7.35 MPa). In an alternative example, at step 106, the carbon dioxide in the supercritical fluid cycle 302 may be heated such that the carbon dioxide, located at an inlet of the supercritical fluid compressor 310, is at or above the critical point of carbon dioxide. Continuing with the previous example wherein the second cycle 304 utilizes TES, the heat transferred from the TES to the carbon dioxide via heat exchanger 332 is sufficient to maintain the temperature of the carbon dioxide to be at or above its critical temperature during steady-state operating conditions (i.e., the carbon dioxide flowing in the closed supercritical fluid cycle 302 is maintained in the supercritical state).

At step 108, a discharge mass of carbon dioxide may be vented from a location along supercritical fluid cycle 302 that is on an exhaust side of the high-pressure supercritical fluid turbine 314. For example, a discharge valve 322 may be located along supercritical flow path 306 after the high-pressure turbine 314 (e.g., along section 345). Alternatively, a discharge valve 322 may be located along supercritical flow path 306 after the power turbine 316 (e.g., along section 349. The discharge valve 322 may be in electronic communication with a controller (not shown). Discharge valve 322 may be opened for a prescribed length of time to vent the desired amount of carbon dioxide from supercritical fluid cycle 302. For example, discharge valve 322 may be opened to vent a discharge mass of carbon dioxide that reduces the mass of carbon dioxide in the supercritical fluid cycle from the starting mass to the design operating mass. Alternatively, discharge valve 322 may be opened to vent and reduce the mass of carbon dioxide in the supercritical fluid cycle 302 to an amount that is less than the starting mass but greater than the design operating mass. At step 108, the discharge mass of carbon dioxide may be vented from the closed cycle 302 into a containment vessel (not shown) that is at a lower pressure than the pressure inside the closed cycle. Alternatively, the discharge mass may be vented to atmosphere.

Opening discharge valve 322 may result in a pressure sink aft of the high-pressure turbine 314 that may cause the carbon dioxide to flow along supercritical flow path 306. For example, the carbon dioxide may flow along sections 349, 350, 341, 342 and 343 of supercritical flow path 306 and flow through cross cycle heat exchanger 332, wherein heat is transferred to the carbon dioxide from the heated air flowing along air flow path 308. The heated carbon dioxide is directed along section 344 to the inlet of the high-pressure turbine 314, thereby initiating rotation of the high-pressure turbine wheel, which drives the compressor 310 via shaft 312. The compressor 310 supplies additional compressed flow of carbon dioxide (which may be in a supercritical state) along section 342 of supercritical fluid flow path 306 until a start is successfully achieved at step 312.

The rate at which the carbon dioxide fluid is encouraged to flow along supercritical flow path 306 may be controlled by varying the opening of the discharge valve 322, thereby controlling the rate of acceleration of the turbomachine. Controlling the rate of acceleration of the turbomachine may have benefits, including managing radial loads on the radial bearings, as well as allowing an operator to transit rotor dynamically-unstable speeds at a rate which protects the turbomachine from damage.

The discharge start method may also include optional step 110 to control a flow direction of the working fluid through the closed supercritical fluid cycle 302 along supercritical flow path 306. In an exemplary operation, working fluid may flow from the compressor outlet along sections 342 and 343 to heat exchanger 332 and to the high-pressure turbine inlet via section 344. And the working fluid may flow from the high-pressure turbine outlet along sections 345, 346, 347, 348 and 349 to recuperating heat exchanger 330 and to the compressor inlet via sections 350 and 341. The supercritical fluid cycle 302 may include a check valve located downstream from the discharge valve that may help to encourage the majority of working fluid to flow along the supercritical fluid flow path 306 in the desired direction. For example, a check valve may be located along section 349 of the supercritical flow path 306. Alternatively, check valves may be located along sections 346 and 348 of the supercritical flow path 306. In another alternative, power turbine 316 may comprise one or more turbine nozzles configured to discourage backflow of the working fluid along supercritical flow path 306 (e.g., flowing from the power turbine 316 along section 346 to the high-pressure turbine 314).

Figure 4:
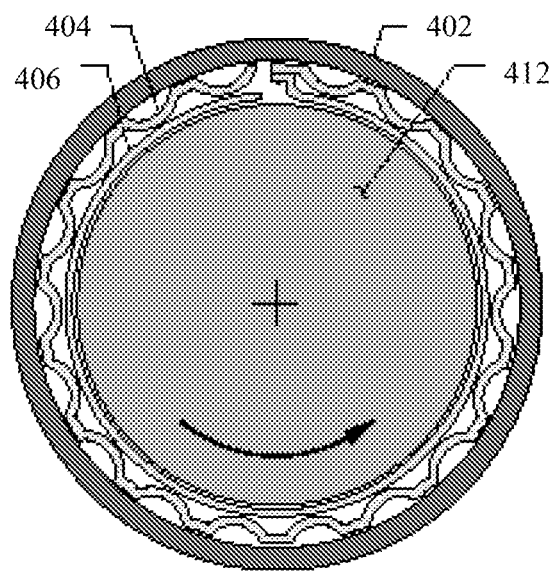
FIG. 4 illustrates a foil bearing, which may be utilized in an exemplary turbomachine.

In an alternative application, the discharge start method may comprise the steps of: step 102, charging the closed cycle 302 with a starting mass of working fluid (e.g., carbon dioxide); step 104, heating the working fluid; and step 108, venting a discharge mass of working fluid from discharge valve 322 until a start is achieved. In this exemplary method, the discharge mass may be vented from the closed cycle 302 when the temperature of the working fluid is within a predetermined temperature range of the critical temperature of the working fluid (e.g., for carbon dioxide, approximately 304.2° K and 7.35 MPa). For example, the carbon dioxide may be heated to within 10 to 15° K of its critical temperature. In another alternative, the carbon dioxide may be heated to within 5 to 10° K of its critical temperature. In yet another alternative, the carbon dioxide may be heated to within 2 to 5° K of its critical temperature. In yet another alternative, the carbon dioxide may be heated to within 1 to 2° K of its critical temperature. In yet another alternative, the supercritical fluid may be heated to within 0.2 to 1° K of its critical temperature. This would result in two phase flow of the carbon dioxide along the closed cycle flow path 306 for some period of time after the turbomachine start until sufficient heat is added to the carbon dioxide via heat exchanger 332 to raise the temperature of the carbon dioxide to be at or above its critical point FIG. 4 illustrates an exemplary foil bearing 400, one or more of which may be used in a turbomachine to support a shaft 412 that connects a compressor and a high-speed turbine (e.g., FIG. 2, compressor 210 and high-speed turbine 214). The foil bearing 400 may include a bearing sleeve 402, a bump foil 404 and a top foil 406. The shaft 412 is supported by a compliant, spring-loaded top foil 406. In operation, once shaft 412 is spinning fast enough (i.e., at or above a critical speed), the working fluid (e.g., supercritical carbon dioxide) pushes the top foil 406 away from the shaft 412 so that no contact occurs. The shaft 412 and top foil 406 are separated by a gap of high-pressure working fluid, which is generated by the shaft rotation that pulls working fluid into the bearing via viscosity effects. The relative high speed of the shaft with respect to the top foil is required to initiate the gap, and once the gap has been achieved, no wear occurs. Thus, the top foil 406 will contact the shaft 412 during the turbomachine startup and shutdown when the shaft is rotating at speeds less than the critical speed.

The top foil 406 may have a coating to protect the bearing while it contacts the shaft 412 during startup and shutdown. The inventors have determined that the rate at which the turbomachine is decelerated during the shutdown determines how much bearing wear occurs at each shutdown. Decelerating quickly will have the desired effect of increasing bearing life.

Referring to FIG. 2, power generation system 200 includes at least one core disposed along supercritical fluid flow path 206. Each core includes a supercritical fluid compressor 210 connected via a shaft 212 to a first supercritical fluid turbine 214. The compressor 210, shaft 212, and turbine 214 may also be collectively referred to herein as a turbomachine. The compressor 210 may be an axial, radial, reciprocating or the like type of compressor. The turbine 214 may be referred to as the high-pressure turbine. The compressor 210 is configured to receive and compress a supercritical fluid and the turbine 214 is configured to receive and expand the supercritical fluid.

The power generation system 200 may also include a heat exchanger 226 disposed along supercritical flow path 206 upstream of the compressor 210. The heat exchanger 226 may comprise a cooler. In normal operation, heat exchanger 226 may be configured to maintain the temperature of the supercritical fluid directed to an inlet of the compressor 210 to be at or slightly above the critical temperature of the supercritical fluid (e.g., within between 0.2 and 2° K of its critical temperature). For example, the heat exchanger 226 may be configured to receive a flow of supercritical fluid and a flow of a cooling medium, and to transfer heat from the supercritical fluid to the cooling medium. In an exemplary operation, heat exchanger 226 may comprise a cooler that receives a flow of supercritical fluid 28 and a flow of water from water input 225a. Heat exchanger 226 may discharge a flow of heated water 225b and a cooled flow of supercritical fluid 42 that is directed to an inlet of the compressor 210. Alternatively, heat exchanger 226 may receive a flow of air as the cooling medium.

Referring to FIG. 3, power generation system 300 includes at least one core disposed along supercritical fluid flow path 306. Each core includes a supercritical fluid compressor 310 connected via a shaft 312 to a first supercritical fluid turbine 314. The compressor 310, shaft 312, and turbine 314 may also be collectively referred to herein as a turbomachine. The compressor 310 may be an axial, radial, reciprocating or the like type of compressor. The turbine 314 may be referred to as the high-pressure turbine. The compressor 310 is configured to receive and compress a supercritical fluid and the turbine 314 is configured to receive and expand the supercritical fluid.

The power generation system 300 may also include a heat exchanger 326 disposed along supercritical flow path 306 upstream of the compressor 310. The heat exchanger 326 may comprise a cooler. In normal operation, heat exchanger 326 may be configured to maintain the temperature of the supercritical fluid directed to an inlet of the compressor 310 to be at or slightly above the critical temperature of the supercritical fluid (e.g., within between 0.2 and 2° K of its critical temperature). For example, the heat exchanger 326 may be configured to receive a flow of supercritical fluid and a flow of a cooling medium, and to transfer heat from the supercritical fluid to the cooling medium. In an exemplary operation, heat exchanger 326 may comprise a cooler that receives a flow of supercritical fluid 350 and a flow of water from water input 325a. Heat exchanger 326 may discharge a flow of heated water 325b and a cooled flow of supercritical fluid 341 that is directed to an inlet of the compressor 310. Alternatively, heat exchanger 326 may receive a flow of air as the cooling medium.

Figure 5:
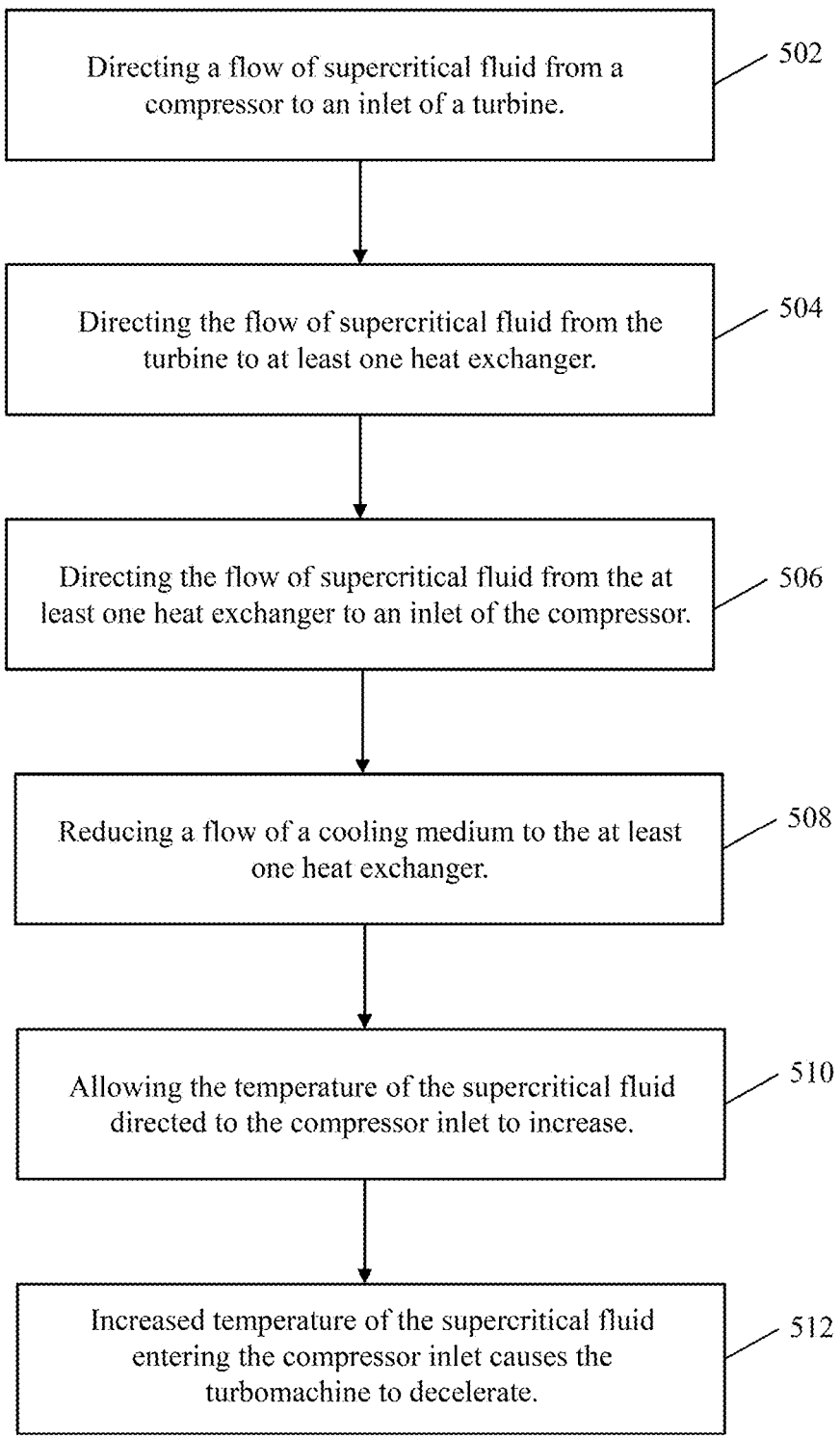
FIG. 5. illustrates an exemplary method for decelerating a turboturbine in a power generation system that utilizes a supercritical fluid in a closed cycle.

FIG. 5 illustrates an exemplary method for decelerating a turbomachine according to an aspect of the disclosure. Referring to FIGS. 2 and 5, at step 502, a flow of supercritical fluid is directed from the compressor 210 along supercritical flow path 206 to an inlet of the turbine 214 (e.g., sections 44, 54). At step 504, the flow of supercritical fluid is exhausted from the turbine 214 and directed along supercritical flow path 206 (e.g., sections 56, 60, 28) to at least one heat exchanger 226. At step 506, the flow of supercritical fluid is directed along supercritical flow path 206 (e.g., section 42) from the at least one heat exchanger 226 to an inlet of the compressor 210. At step 508, a flow of a cooling medium (e.g., water, air) directed to heat exchanger 226 is reduced. At step 510, the reduced flow of cooling medium to heat exchanger 226 allows the temperature of the supercritical fluid directed to the compressor inlet to increase. At step 512, the increased temperature of the supercritical fluid entering the compressor inlet has the effect of braking the turbomachine thereby causing it to decelerate.

FIG. 5 illustrates an exemplary method for decelerating a turbomachine according to an aspect of the disclosure. Referring to FIGS. 3 and 5, at step 402, a flow of supercritical fluid is directed from the compressor 310 along supercritical flow path 306 to an inlet of the turbine 314 (e.g., sections 342, 344). At step 404, the flow of supercritical fluid is exhausted from the turbine 314 and directed along supercritical flow path 306 (e.g., sections 345, 349, 350) to at least one heat exchanger 326. At step 406, the flow of supercritical fluid is directed along supercritical flow path 306 (e.g., section 341) from the at least one heat exchanger 326 to an inlet of the compressor 310. At step 408, a flow of a cooling medium (e.g., water, air) directed to heat exchanger 326 is reduced. At step 410, the reduced flow of cooling medium to heat exchanger 326 allows the temperature of the supercritical fluid directed to the compressor inlet to increase. At step 412, the increased temperature of the supercritical fluid entering the compressor inlet has the effect of braking the turbomachine thereby causing it to decelerate.

The foregoing description is provided for the purpose of explanation and is not to be construed as limiting the invention. While the invention has been described with reference to illustrative examples or methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

What is claimed:

1. In a system for generating power utilizing a closed cycle with a working fluid, when the working fluid is in a supercritical state, the closed cycle including a turbomachine comprising a supercritical fluid compressor connected via a shaft to a supercritical fluid turbine, a method for starting the turbomachine comprising the steps of:
   a) charging a mass of working fluid that is not in the supercritical state in the closed cycle up to a starting mass that is greater than a design operating mass, wherein the design operating mass is the mass of working fluid in the closed cycle when operating at steady-state design point conditions;
   b) heating the working fluid; and
   c) venting a discharge mass of working fluid from the closed cycle at a location in the closed cycle that is on an exhaust side of the supercritical fluid turbine.

2. The method of claim 1, wherein the heating step further comprises heating the working fluid such that the working fluid is at or above the critical point of the working fluid prior to the venting step.

3. The method of claim 1, wherein the heating step further comprises heating the working fluid such that the working fluid at an inlet of the supercritical fluid compressor is at or above the critical point of the working fluid prior to the venting step.

4. The method of claim 1, wherein the heating step further comprises heating the working fluid to within a predetermined temperature range of a critical temperature of the working fluid prior to the venting step.

5. The method of claim 4, wherein the predetermined temperature range is within 10 to 15 degrees Kelvin (° K) of the critical temperature of the working fluid.

6. The method of claim 4, wherein the predetermined temperature range is within 5 to 10 degrees Kelvin (° K) of the critical temperature of the working fluid.

7. The method of claim 4, wherein the predetermined temperature range is within 2 to 5 degrees Kelvin (° K) of the critical temperature of the working fluid.

8. The method of claim 4, wherein the predetermined temperature range is within 1 to 2 degrees Kelvin (° K) of the critical temperature of the working fluid.

9. The method of claim 4, wherein the predetermined temperature range is within 0.2 to 1 degrees Kelvin (° K) of the critical temperature of the working fluid.

10. The method of claim 1, wherein venting the discharge mass reduces the mass of working fluid in the closed cycle from the starting mass to the design operating mass.

11. The method of claim 10, wherein the venting step further comprises venting a second discharge mass of working fluid from the closed cycle that reduces the mass of working fluid in the closed cycle to an amount that is less than the design operating mass.

12. The method of claim 1, wherein venting the discharge mass reduces the mass of working fluid in the closed cycle to an amount that is less than the starting mass but greater than the design operating mass.

13. The method of claim 1, wherein the venting step further comprises controlling the rate at which the discharge mass is vented from the closed supercritical fluid cycle.

14. The method of claim 1, wherein the turbomachine further comprises a supercritical fluid power turbine positioned along the closed cycle at a location that is on the exhaust side of the supercritical fluid turbine.

15. The method of claim 14, further comprising a step of controlling a flow direction of the working fluid through the closed cycle.

16. The method of claim 15, wherein the controlling the working fluid flow direction step is performed by one or more fluidic diodes.

17. The method of claim 15, wherein the controlling the working fluid flow direction step is performed by one or more nozzles of the power turbine.

18. The method of claim 1, wherein the discharge mass of working fluid is vented into a containment vessel.

19. The method of claim 1, wherein the discharge mass of working fluid is vented to atmosphere.

20. The method of claim 1, wherein the heating step further comprises transferring heat from a Thermal Energy Storage (TES) to the working fluid such that a temperature of the working fluid in the closed cycle is maintained above a critical temperature of the working fluid.

21. The method of claim 1, wherein the working fluid is carbon dioxide.

* * * * *